(12) United States Patent
Backman et al.

(10) Patent No.: US 8,361,578 B2
(45) Date of Patent: *Jan. 29, 2013

(54) PROCESS FOR COATING A PIPE WITH HIGH THROUGHPUT USING MULTIMODAL ETHYLENE COPOLYMER, AND COATED PIPES OBTAINED THEREOF

(75) Inventors: Mats Backman, Göteborg (SE); Martin Anker, Hisings Kärre (SE); Siw Bodil Fredriksen, Skien (NO); Leif Leiden, Andersböle (FI); Markku Vahteri, Porvoo (FI); Petri Rekonen, Porvoo (FI)

(73) Assignee: Borealis Technology OY, Porvoo (FI)

( * ) Notice: Subject to any disclaimer, the term of this patent is extended or adjusted under 35 U.S.C. 154(b) by 70 days.

This patent is subject to a terminal disclaimer.

(21) Appl. No.: 12/745,804

(22) PCT Filed: Dec. 8, 2008

(86) PCT No.: PCT/EP2008/010406
§ 371 (c)(1),
(2), (4) Date: Aug. 31, 2010

(87) PCT Pub. No.: WO2009/080195
PCT Pub. Date: Jul. 2, 2009

(65) Prior Publication Data
US 2010/0313986 A1 Dec. 16, 2010

(30) Foreign Application Priority Data
Dec. 20, 2007 (EP) .................................. 07024738

(51) Int. Cl.
*B32B 1/08* (2006.01)
*B32B 15/085* (2006.01)
*F16L 9/14* (2006.01)
*B05D 7/00* (2006.01)

(52) U.S. Cl. ...................... 428/35.7; 428/35.8; 428/35.9; 428/36.91; 138/141; 138/143; 138/145; 138/146; 427/407.1

(58) Field of Classification Search ................. 428/35.7, 428/35.8, 35.9, 36.4, 36.6, 36.7, 36.8, 36.9, 428/36.91; 138/140, 141, 143, 145, 146; 427/407.1
See application file for complete search history.

(56) References Cited

U.S. PATENT DOCUMENTS

| 3,324,093 A | 6/1967 | Alleman |
| 3,405,109 A | 10/1968 | Rohlfing |

(Continued)

FOREIGN PATENT DOCUMENTS

| EP | 0 075 049 | 3/1983 |
| EP | 0 428 054 | 5/1991 |

(Continued)

OTHER PUBLICATIONS

Heino, E.L., et al., *Rheological characterization of polyethylene fractions*, Porvoo, Finland, Theor. Appl. Rheol., Proc. XIth Int. Congr. on Rheology, 11th, 360-362, Aug. 1992.

(Continued)

*Primary Examiner* — Walter B Aughenbaugh
(74) *Attorney, Agent, or Firm* — Fay Sharpe LLP

(57) ABSTRACT

Coated pipes have a layer of multimodal polyethylene. The multimodal ethylene copolymer is a copolymer of ethylene with one or more alpha-olefin comonomers having from 4 to 10 carbon atoms and has a weight average molecular weight of from 70000 g/mol to 250000 g/mol, the ratio of the weight average molecular weight to the number average molecular weight, Mw/Mn, of from 15 to 50, a melt index $MFR_2$ of from 0.05 g/10 min to 5 g/10 min, a melt index $MFR_5$ of from 0.5 to 10 g/10 min and a density of from 930 kg/m³ to 955 kg/m³.

30 Claims, 1 Drawing Sheet

U.S. PATENT DOCUMENTS

| | | | |
|---|---|---|---|
| 4,582,816 A | 4/1986 | Miro | |
| 4,588,780 A | 5/1986 | Edwards et al. | |
| 4,877,587 A | 10/1989 | Rhee et al. | |
| 4,994,534 A | 2/1991 | Rhee et al. | |
| 5,391,654 A | 2/1995 | Ahvenainen et al. | |
| 7,595,364 B2 * | 9/2009 | Shannon et al. | 525/191 |
| 8,039,073 B2 * | 10/2011 | Lahijani | 428/36.91 |
| 8,142,871 B2 * | 3/2012 | Anker et al. | 428/36.92 |

FOREIGN PATENT DOCUMENTS

| | | |
|---|---|---|
| EP | 0 628 343 | 12/1994 |
| EP | 0 479 186 | 3/1995 |
| EP | 0 688 794 | 12/1995 |
| EP | 0 699 213 | 2/1998 |
| EP | 0 837 915 | 8/2001 |
| EP | 1 316 598 | 6/2003 |
| EP | 0 810 235 | 11/2004 |
| EP | 1 739 103 | 1/2007 |
| EP | 1 752 462 | 2/2007 |
| EP | 1 859 926 | 11/2007 |
| EP | 1 865 037 | 9/2009 |
| FI | 921 632 | 10/1993 |
| FI | 933 073 | 1/1995 |
| FI | 935 856 | 6/1995 |
| WO | WO 92/12182 | 7/1992 |
| WO | WO 94/28032 | 12/1994 |
| WO | WO 95/12622 | 5/1995 |
| WO | WO 96/18662 | 6/1996 |
| WO | WO 96/32423 | 10/1996 |
| WO | WO 97/03139 | 1/1997 |
| WO | WO 97/28170 | 8/1997 |
| WO | WO 98/32776 | 7/1998 |
| WO | WO 99/51646 | 10/1999 |
| WO | WO 99/61489 | 12/1999 |
| WO | WO 01/55230 | 8/2001 |
| WO | WO 03/010208 | 2/2003 |
| WO | WO 03/051514 | 6/2003 |
| WO | WO 03/051934 | 6/2003 |
| WO | WO 2004/067654 | 8/2004 |
| WO | WO 2004/085499 | 10/2004 |
| WO | WO 2005/118655 | 12/2005 |
| WO | WO 2006/063771 | 6/2006 |

OTHER PUBLICATIONS

Heino, E.L., *The influence of molecular structure on some Rheological Properties of Polyethylene*, Porvoo, Finland, Annual Transactions of the Nordic Rheology Society, vol. 3, 1995.

International Search Report mailed Apr. 15, 2009 for International application No. PCT/EP2008/010406.

Written Opinion mailed Apr. 15, 2009 for International application No. PCT/EP2008/010406.

International Preliminary Report on Patentability mailed Mar. 19, 2010 for International application No. PCT/EP2008/010406.

* cited by examiner

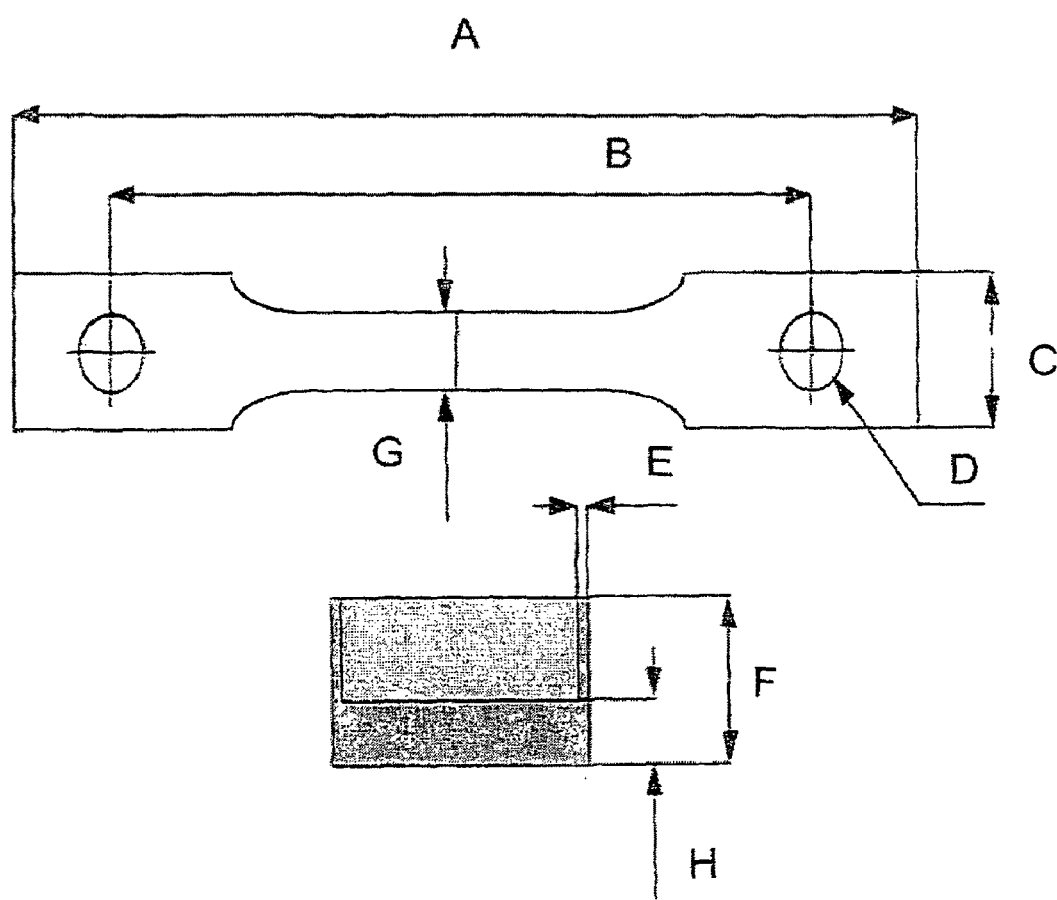

PROCESS FOR COATING A PIPE WITH HIGH THROUGHPUT USING MULTIMODAL ETHYLENE COPOLYMER, AND COATED PIPES OBTAINED THEREOF

OBJECTIVE OF THE INVENTION

The present invention is directed to polymer coated pipes. More specifically, the present invention is directed to coated metal pipes having a high mechanical strength and which can be produced at a high throughput. In addition, the present invention is directed to a method of producing such coated metal pipes with a high throughput and good production economy.

TECHNICAL BACKGROUND AND PRIOR ART

The use of bimodal or multimodal ethylene polymers in coating of steel pipes is known from EP-A-837915. However, even though the document teaches that the composition has a good processability it still remains a wish to further improve the processability, like maximum throughput and neck-in.

SUMMARY OF THE INVENTION

The present invention provides polyethylene coated metal pipes comprising a coating composition that can be processed onto the pipe at a high throughput and good economy.

The first aspect of the invention is to provide a pipe comprising an inner surface, an outer surface layer (A) and a coating layer (B) covering said outer surface layer (A) wherein the coating layer (B) comprises a coating composition (B-2) comprising a multimodal copolymer of ethylene and one or more alpha-olefin comonomers having from 4 to 10 carbon atoms (B-1), wherein the multimodal ethylene copolymer (B-1) has a weight average molecular weight of from 70000 g/mol to 250000 g/mol, the ratio of the weight average molecular weight to the number average molecular weight, Mw/Mn, of from 15 to 50, a melt index $MFR_2$ of from 0.05 g/10 min to 5 g/10 min, a melt index $MFR_5$ of from 0.5 to 10 g/10 min and a density of from 930 kg/m$^3$ to 955 kg/m$^3$.

The second aspect of the invention is providing pipes according comprising an inner surface and an outer surface layer (A) and a coating layer (B) covering said outer surface layer (A), which coating layer (B) comprises a coating composition (B-2) comprising a multimodal copolymer of ethylene and one or more alpha-olefin comonomers having from 4 to 10 carbon atoms (B-1), wherein the multimodal ethylene copolymer (B-1) further comprises (B-1-1) from 40 to 60% based on the weight of the multimodal ethylene copolymer a low molecular weight ethylene homopolymer component, said low molecular weight ethylene homopolymer having a weight average molecular weight of from 5000 g/mol to 35000 g/mol; and (B-1-2) from 60 to 40% based on the weight of the multimodal ethylene copolymer a high molecular weight ethylene copolymer component, said high molecular weight ethylene copolymer having a weight average molecular weight of from 100000 g/mol to 700000 g/mol; and the multimodal ethylene copolymer (B-1) has a weight average molecular weight of from 70000 g/mol to 250000 g/mol, the ratio of the weight average molecular weight to the number average molecular weight, Mw/Mn, of from 15 to 50, a melt index $MFR_2$ of from 0.05 g/10 min to 5 g/10 min, a melt index $MFR_5$ of from 0.5 to 10 g/10 min and a density of from 930 kg/m$^3$ to 955 kg/m$^3$.

The third aspect of the present invention provides a method for producing the coated pipes as disclosed above. The process comprises the steps of:

providing a pipe having an outer surface layer (A);

applying a coating composition (B-2) onto the pipe outer surface layer (A) to form a coating layer (B), wherein the coating composition (B-2) comprises a multimodal copolymer of ethylene and one or more alpha-olefin comonomers having from 4 to 10 carbon atoms (B-1), wherein the multimodal ethylene copolymer (B-1) has a weight average molecular weight of from 70000 g/mol to 250000 g/mol, the ratio of the weight average molecular weight to the number average molecular weight, Mw/Mn, of from 15 to 50, a melt index $MFR_2$ of from 0.05 g/10 min to 5 g/10 min, a melt index $MFR_5$ of from 0.5 to 10 g/10 min and a density of from 930 kg/m$^3$ to 955 kg/m$^3$.

The fourth aspect of the present invention is providing a process comprising the steps of:

(i) polymerising, in a first polymerisation stage, a low molecular weight ethylene homopolymer (B-1-1) in the presence of a polymerisation catalyst, hydrogen, ethylene and optionally an inert diluent to produce an ethylene homopolymer having a weight average molecular weight of from 5000 g/mol to 35000 g/mol and which constitutes from 40 to 60% by weight of the multimodal ethylene copolymer (B-1); and (ii) polymerising, in a second polymerisation stage, a high molecular weight copolymer of ethylene and one or more alpha-olefin comonomers having from 4 to 10 carbon atoms (B-1-2) in the presence of a polymerisation catalyst, ethylene, at least one alpha-olefin comonomer having from 4 to 10 carbon atoms, and optionally hydrogen and/or an inert diluent to produce a copolymer of ethylene and one or more alpha-olefin comonomers having from 4 to 10 carbon atoms having a weight average molecular weight of from 200000 g/mol to 700000 g/mol, which high molecular weight ethylene component (B-1-2) constitutes from 40 to 60% by weight of the multimodal ethylene copolymer (B-1); and wherein said first and said second polymerisation step are performed as successive polymerisation steps with the polymer product produced in any previous step being present in the subsequent step(s) and wherein said first step and said second step can be performed in any order and wherein the resulting multimodal ethylene copolymer (B-1) has a weight average molecular weight of from 70000 g/mol to 250000 g/mol, the ratio of the weight average molecular weight to the number average molecular weight, Mw/Mn, of from 15 to 50, a melt index $MFR_2$ of from 0.05 g/10 min to 5 g/10 min, a melt index $MFR_5$ of from 0.5 to 10 g/10 min and a density of from 930 kg/m$^3$ to 955 kg/m$^3$;

(iii) recovering said multimodal ethylene copolymer (B-1);

(iv) obtaining the coating composition (B-2) comprising 80 to 100% by weight, preferably from 85 to 100% by weight and in particular from 90 to 99% by weight of the multimodal ethylene copolymer (B-1), optional additives and optional other polymers;

(iv) applying said coating composition (B-2) onto the pipe outer surface layer (A) to form the coating layer (B).

The pipe coating process allows the preparation of coated pipes having good mechanical properties with a high throughput.

BRIEF DESCRIPTION OF THE DRAWINGS

FIG. 1 depicts a sample with a notch used to determine the constant tensile load of a coating composition of the invention.

DETAILED DESCRIPTION

Multimodal Ethylene Copolymer

The multimodal ethylene copolymer (B-1) comprises a low molecular weight ethylene homopolymer component and a high molecular weight ethylene copolymer component. The multimodal ethylene copolymer (B-1) has a weight average molecular weight of 70000 to 250000 g/mol, the ratio of the weight average molecular weight to the number average molecular weight, Mw/Mn, of from 15 to 50, a melt index $MFR_2$ of from 0.05 to 5 g/10 min, preferably from 0.1 to 1.2 g/10 min, and more preferably from 0.2 to 1.0 g/10 min. Preferably, it further has an $MFR_5$ of 0.5 to 10 g/10 min, more preferably from 1.0 to 5.0 g/10 min. Furthermore, the multimodal ethylene copolymer (B-1) has a density of from 930 to 955 kg/m$^3$, preferably from 935 to 955 kg/m$^3$ and more preferably from 935 to 953 kg/m$^3$.

Preferably the multimodal ethylene copolymer (B-1) has a broad molecular weight distribution as indicated by the ratio of weight average molecular weight to the number average molecular weight, Mw/Mn, of from 20 to 50, more preferably from 25 to 45 and in particular from 28 to 40.

The multimodal ethylene copolymer (B-1) advantageously comprises from 40 to 60% by weight, based on the multimodal ethylene copolymer (B-1), of low molecular weight ethylene homopolymer component (B-1-1). The low molecular weight ethylene homopolymer component (B-1-1) has a weight average molecular weight of from 5000 to 35000 g/mol, preferably form 10000 to 30000 g/mol. Preferably the low molecular weight ethylene homopolymer component (B-1-1) has a melt index $MFR_2$ of from 500 to 1500 g/10 min, more preferably from 700 to 1500 g/10 min. The inventors have found that when the low molecular weight ethylene homopolymer (B-1-1) has the melt index within the above-mentioned range, the multimodal ethylene copolymer (B-1) can be conveniently produced.

Preferably still, the multimodal ethylene copolymer (B-1) comprises from 49 to 59% by weight of the multimodal ethylene copolymer (B-1) of the low molecular weight ethylene homopolymer component (B-1-1), which preferably has a melt index $MFR_2$ of from 500 to 1500 g/10 min. The inventors have found that the above-mentioned combination further facilitates the production of the specified multimodal ethylene copolymer (B-1).

It should be understood that within the meaning of the present invention the term "homopolymer" is used to mean a linear ethylene polymer which essentially consists of ethylene repeating units. It may contain trace amount of units derived from other polymerisable monomers, but it should contain at least about 99.9% by mole of ethylene repeating units, based on all the repeating units present in the low molecular weight ethylene homopolymer component.

The multimodal ethylene copolymer (B-1) also advantageously comprises from 40 to 60% by weight, based on the multimodal ethylene copolymer (B-1), a high molecular weight copolymer of ethylene and alpha-olefins having from 4 to 10 carbon atoms (B-1-2). The high molecular weight copolymer component (B-1-2) has a weight average molecular weight of from 100000 to 700000 g/mol, preferably 150000 to 300000 g/mol. Preferably, it further has a content of alpha-olefin comonomers having from 4 to 10 carbon atoms of 0.5 to 10% by mole, preferably from 1 to 5% by mole, based on the total number of moles of repeating units in the high molecular weight copolymer component (B-1-2).

Preferably still, the multimodal ethylene copolymer (B-1) comprises from 41 to 51% by weight of the multimodal ethylene copolymer (B-1) of the high molecular weight ethylene copolymer component (B-1-2). The inventors have found that the above-mentioned amount of the high molecular weight component further facilitates the production of the specified multimodal ethylene copolymer (B-1).

It should be understood that within the meaning of the present invention the term "copolymer of ethylene and alpha-olefins having from 4 to 10 carbon atoms" is used to mean an ethylene polymer which essentially consists of ethylene repeating units and repeating units derived from alpha-olefins having from 4 to 10 carbon atoms. It may contain trace amount of units derived from other polymerisable monomers, but it should contain at least about 99.9% by mole of above-mentioned repeating units, based on all the repeating units present in the high molecular weight ethylene copolymer component.

In addition to the two components referred above the multimodal ethylene copolymer (B-1) may contain up to 20%, preferably up to 10%, by weight of other polymer components. The amount and the properties of such additional polymer components may be selected freely provided that the properties of the multimodal ethylene copolymer (B-1) and of the two above-mentioned components are those discussed above.

Polymerisation Process

The multimodal ethylene copolymer may be produced in any suitable polymerisation process known in the art. Preferably the multimodal ethylene copolymer is produced in a sequential polymerisation process comprising at least two polymerisation zones operating at different conditions to produce the multimodal copolymer. The polymerisation zones may operate in slurry, solution, or gas phase conditions or their combinations. Suitable processes are disclosed, among others, in WO-A-92/12182 and WO-A-96/18682.

Catalyst

The polymerisation is conducted in the presence of an olefin polymerisation catalyst. The catalyst may be any catalyst which is capable of producing all components of the multimodal ethylene copolymer. Suitable catalysts are, among others, Ziegler-Natta catalysts based on a transition metal, such as titanium, zirconium and/or vanadium or metallocene catalysts or late transition metal catalysts, as well as their mixtures. Especially Ziegler-Natta catalysts and metallocene catalysts are useful as they can produce polymers within a wide range of molecular weight with a high productivity.

Suitable Ziegler-Natta catalysts preferably contain a magnesium compound, an aluminium compound and a titanium compound supported on a particulate support.

The particulate support can be an inorganic oxide support, such as silica, alumina, titania, silica-alumina and silica-titania. Preferably, the support is silica.

The average particle size of the silica support can be typically from 10 to 100 μm. However, it has turned out that special advantages can be obtained if the support has an average particle size from 15 to 30 μm, preferably from 18 to 25 μm. Alternatively, the support may have an average particle size of from 30 a 80 μm, preferably from 30 to 50 μm. Examples of suitable support materials are, for instance, ES747JR produced and marketed by Ineos Silicas (former Crossfield), and SP9-491, produced and marketed by Grace.

The magnesium compound is a reaction product of a magnesium dialkyl and an alcohol. The alcohol is a linear or branched aliphatic monoalcohol. Preferably, the alcohol has from 6 to 16 carbon atoms. Branched alcohols are especially preferred, and 2-ethyl-1-hexanol is one example of the preferred alcohols. The magnesium dialkyl may be any compound of magnesium bonding to two alkyl groups, which may be the same or different. Butyl-octyl magnesium is one example of the preferred magnesium dialkyls.

The aluminium compound is chlorine containing aluminium alkyl. Especially preferred compounds are aluminium alkyl dichlorides and aluminium alkyl sesquichlorides.

The titanium compound is a halogen containing titanium compound, preferably chlorine containing titanium compound. Especially preferred titanium compound is titanium tetrachloride.

The catalyst can be prepared by sequentially contacting the carrier with the above mentioned compounds, as described in EP-A-688794 or WO-A-99/51646. Alternatively, it can be prepared by first preparing a solution from the components and then contacting the solution with a carrier, as described in WO-A-01/55230.

Another, especially preferred, group of suitable Ziegler-Natta catalysts contain a titanium compound together with a magnesium halide compound without an inert support. Thus, the catalyst contains a titanium compound on a magnesium dihalide, like magnesium dichloride. Such catalysts are disclosed, for instance, in WO-A-2005/118655 and EP-A-810235.

The Ziegler-Natta catalyst is used together with an activator. Suitable activators are metal alkyl compounds and especially aluminium alkyl compounds. These compounds include alkyl aluminium halides, such as ethylaluminium dichloride, diethylaluminium chloride, ethylaluminium sesquichloride, dimethylaluminium chloride and the like. They also include trialkylaluminium compounds, such as trimethylaluminium, triethylaluminium, triisobutylaluminium, trihexylaluminium and tri-n-octylaluminium. Furthermore they include alkylaluminium oxy-compounds, such as methylaluminiumoxane, hexaisobutylaluminiumoxane and tetraisobutylaluminiumoxane. Also other aluminium alkyl compounds, such as isoprenylaluminium, may be used. Especially preferred activators are trialkylaluminiums, of which triethylaluminium, trimethylaluminium and tri-isobutylaluminium are particularly used.

The amount in which the activator is used depends on the specific catalyst and activator. Typically triethylaluminium is used in such amount that the molar ratio of aluminium to the transition metal, like Al/Ti, is from 1 to 1000, preferably from 3 to 100 and in particular from about 5 to about 30 mol/mol.

As discussed above, also metallocene catalysts may be used to produce the multimodal ethylene copolymer. Suitable metallocene catalysts are known in the art and are disclosed, among others, in WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103.

Polymerisation

The polymerisation zone where the low molecular weight ethylene homopolymer is produced typically operates at a temperature of from 20 to 150° C., preferably from 50 to 110° C. and more preferably from 60 to 100° C. The polymerisation may be conducted in slurry, gas phase or solution.

The catalyst may be transferred into the polymerisation zone by any means known in the art. It is thus possible to suspend the catalyst in a diluent and maintain it as homogeneous slurry. Especially preferred it is to use oil having a viscosity form 20 to 1500 mPa·s as diluent, as disclosed in WO-A-2006/063771. It is also possible to mix the catalyst with a viscous mixture of grease and oil and feed the resultant paste into the polymerisation zone. Further still, it is possible to let the catalyst settle and introduce portions of thus obtained catalyst mud into the polymerisation zone in a manner disclosed, for instance, in EP-A-428054. The polymerisation zone may also be preceded by a prepolymerisation zone, in which case the mixture withdrawn from the prepolymerisation zone is directed into the polymerisation zone.

Into the polymerisation zone is also introduced ethylene, optionally an inert diluent, and optionally hydrogen and/or comonomer. The low molecular weight ethylene homopolymer component is produced in a first polymerisation zone and the high molecular weight ethylene copolymer component is produced in a second polymerisation zone. The first polymerisation zone and the second polymerization zone may be connected in any order, i.e. the first polymerisation zone may precede the second polymerisation zone, or the second polymerisation zone may precede the first polymerisation zone or, alternatively, polymerisation zones may be connected in parallel. However, it is preferred to operate the polymerisation zones in cascaded mode.

As it was disclosed above, the low molecular weight homopolymer is produced in the first polymerisation zone. Into the first polymerisation zone are introduced ethylene, hydrogen and optionally an inert diluent. Comonomer is not introduced into the first polymerisation zone. The polymerisation in the first polymerisation zone is conducted at a temperature within the range of from 50 to 115 C, preferably from 80 to 110 C and in particular from 90 to 105 C. The pressure in the first polymerisation zone is from 1 to 300 bar, preferably from 5 to 100 bar.

The polymerisation in the first polymerisation zone may be conducted in slurry. Then the polymer particles formed in the polymerisation, together with the catalyst fragmented and dispersed within the particles, are suspended in the fluid hydrocarbon. The slurry is agitated to enable the transfer of reactants from the fluid into the particles.

The polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane.

The ethylene content in the fluid phase of the slurry may be from 2 to about 50% by mole, preferably from about 3 to about 20% by mole and in particular from about 5 to about 15% by mole. The benefit of having a high ethylene concentration is that the productivity of the catalyst is increased but the drawback is that more ethylene then needs to be recycled than if the concentration was lower.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

It is sometimes advantageous to conduct the slurry polymerisation above the critical temperature and pressure of the fluid mixture. Such operation is described in U.S. Pat. No. 5,391,654.

The amount of hydrogen is adjusted based on the desired melt flow rate and it also depends on the specific catalyst used. For many generally used Ziegler-Natta catalysts the molar ratio of hydrogen to ethylene is from 100 to 1500 mol/kmol, preferably from 200 to 1200 mol/kmol and in particular from 300 to 1000 mol/kmol.

The polymerisation in the first polymerisation zone may also be conducted in gas phase. A preferable embodiment of gas phase polymerisation reactor is a fluidised bed reactor. There the polymer particles formed in the polymerisation are suspended in upwards moving gas. The gas is introduced into the bottom part of the reactor. The upwards moving gas passes the fluidised bed wherein a part of the gas reacts in the presence of the catalyst and the unreacted gas is withdrawn from the top of the reactor. The gas is then compressed and cooled to remove the heat of polymerisation. To increase the cooling capacity it is sometimes desired to cool the recycle gas to a temperature where a part of the gas condenses. After cooling the recycle gas is reintroduced into the bottom of the reactor. Fluidised bed polymerisation reactors are disclosed, among others, in U.S. Pat. Nos. 4,994,534, 4,588,790, EP-A-699213, EP-A-628343, FI-A-921632, FI-A-935856, U.S. Pat. No. 4,877,587, FI-A-933073 and EP-A-75049.

In gas phase polymerisation using a Ziegler-Natta catalyst hydrogen is typically added in such amount that the ratio of hydrogen to ethylene is from 500 to 10000 mol/kmol, preferably from 1000 to 5000 mol/kmol, to obtain the desired molecular weight of the low molecular weight ethylene homopolymer component.

The high molecular weight copolymer of ethylene and at least one alpha-olefin having 4 to 10 carbon atoms is produced in the second polymerisation zone. Into the second polymerisation zone are introduced ethylene, alpha-olefin having 4 to 10 carbon atoms, hydrogen and optionally an inert diluent. The polymerisation in second polymerisation zone is conducted at a temperature within the range of from 50 to 100° C., preferably from 60 to 100° C. and in particular from 70 to 95° C. The pressure in the second polymerisation zone is from 1 to 300 bar, preferably from 5 to 100 bar.

The polymerisation in the second polymerisation zone may be conducted in slurry. The polymerisation may then be conducted along the lines as was discussed above for the first polymerisation zone.

The amount of hydrogen is adjusted based on the desired melt flow rate and it also depends on the specific catalyst used. For many generally used Ziegler-Natta catalysts the molar ratio of hydrogen to ethylene is from 0 to 50 mol/kmol, preferably from 10 to 35 mol/kmol.

Furthermore, the amount of alpha-olefin having from 4 to 10 carbon atoms is adjusted to reach the targeted density. The ratio of the alpha-olefin to ethylene is typically from 100 to 500 mol/kmol, preferably from 150 to 350 mol/kmol.

The polymerisation in the second polymerisation zone may also be conducted in gas phase. In gas phase polymerisation using a Ziegler-Natta catalyst hydrogen is typically added in such amount that the ratio of hydrogen to ethylene is from 5 to 500 mol/kmol, preferably from 30 to 150 mol/kmol to obtain the desired molecular weight of the high molecular weight ethylene copolymer component (B-1-2). The amount of alpha-olefin having from 4 to 10 carbon atoms is adjusted to reach the targeted density. The ratio of the alpha-olefin to ethylene is typically from 10 to 300 mol/kmol, preferably from 30 to 200 mol/kmol.

Coating Composition

The coating composition (B-2) comprises the multimodal ethylene copolymer (B-1) and eventual additives and other polymers. Preferably the coating composition (B-2) comprises from 80 to 100% by weight, more preferably from 85 to 100% by weight and in particular from 90 to 99% by weight of the multimodal ethylene copolymer (B-1).

In addition to the multimodal ethylene copolymer (B-1) the coating composition (B-2) typically contains conventional additives known in the art. Such additives are, among others, antioxidants, process stabilizers, UV-stabilizers, pigments and acid scavengers.

Suitable antioxidants and stabilizers are, for instance, 2,6-di-tert-butyl-p-cresol, tetrakis-[methylene-3-(3',5-di-tert-butyl-4'hydroxyphenyl)propionate]methane, octadecyl-3-3 (3'5'-di-tert-butyl-4'-hydroxyphenyl)propionate, dilaurylthiodipropionate, distearylthiodipropionate, tris-(nonylphenyl)phosphate, distearyl-pentaerythritol-diphosphite and tetrakis(2,4-di-tert-butylphenyl)-4,4'-biphenylene-diphosphonite.

Some hindered phenols are sold under the trade names of Irganox 1076 and Irganox 1010. Commercially available blends of antioxidants and process stabilizers are also available, such as Irganox B225 marketed by Ciba-Geigy.

Antioxidants and stabilizers are typically used in an amount of from about 500 ppm to about 5000 ppm.

Suitable acid scavengers are, for instance, metal stearates, such as calcium stearate and zinc stearate. They are used in amounts generally known in the art, typically from 500 ppm to 10000 ppm and preferably from 500 to 5000 ppm.

Carbon black is a generally used pigment, which also acts as an UV-screener. Typically carbon black is used in an amount of from 0.5 to 5% by weight, preferably from 1.5 to 3.0% by weight. Preferably the carbon black is added as a masterbatch where it is premixed with a polymer, preferably high density polyethylene (HDPE), in a specific amount. Suitable masterbatches are, among others, HD4394, sold by Cabot Corporation, and PPM1805 by Poly Plast Muller. Also titanium oxide may be used as an UV-screener.

In addition the coating composition (B-2) may contain further polymers, such as carrier polymers used in additive masterbatches. The amount and nature of such polymers may be chosen freely within the limits discussed above as long as the properties of the coating composition are not negatively affected.

It is also possible to add a suitable amount of the adhesion polymer into the coating composition (B-2) to improve the adhesion between the pipe surface (A) and the coating layer (B). In this way the amount of the polymer used in the adhesion layer (D) may be reduced and in some cases it may be possible to eliminate the adhesion layer (D) altogether.

Preferably, the coating composition (B-2) has a flow rate ratio $FRR_{5/2}$ of from 2 to 10, preferably from 2 to 6 and in particular from 3 to 5. Preferably still, it has a flow rate ratio $FRR_{21/5}$ of 15 to 40, more preferably from 20 to 35 and/or a shear thinning index $SHI_{2.7/210}$ of from 30 to 100, more preferably from 35 to 100 and especially preferably from 50 to 90.

The coating composition (B-2) preferably has a high resistance to environmental stress cracking. Thus, preferably the coating composition (B-2) has a stress cracking resistance, as measured by CTL (Constant Tensile Load) at 60° C. and 5 MPa of at least 10 h, more preferably of at least 15 h.

Especially preferably the coating composition (B-2) has a shear thinning index $SHI_{2.7/210}$ of from 35 to 100 and the multimodal ethylene copolymer (B-1) contained in the coating composition (B-2) has a ratio of Mw/Mn of from 25 to 50. More advantageously the coating composition (B-2) has $SHI_{2.7/210}$ of from 50 to 90 and the multimodal ethylene copolymer (B-1) has Mw/Mn of from 28 to 40. These combinations have been found to provide excellent processability combined with good mechanical properties.

Coating Layer

The coated pipe has a coating layer (B) which comprises a coating composition (B-2). The coating layer (B) comprises at least 75% by weight, preferably at least 80% by weight and more preferably at least 90% by weight of the coating composition (B-2), based on the total weight of the coating layer (B). Especially preferably, the coating layer (B) consists of the coating composition (B-2).

Pipe Coating and Coated Pipe

It is preferable to properly prepare the surface of the pipe before coating as it is known in the art. The pipe surface is typically inspected for any rust, dirt, flaws, discontinuities, and metal defects. All the excess material needs be removed from the pipe surface to make sure that the coating is properly adhered to the pipe. Suitable cleaning methods include air and water high pressure washing, grit or shot blasting and mechanical brushing. Also acid wash and chromate pre-treatment is sometimes used.

Typically the pipes are heated with induction heating up to about 200° C. The temperature is adjustable depending on the line speed and the material being used in the corrosion preventing layer (C). When the epoxy Teknos AR8434 is used the steel pipe is preferably heated to 190° C. The temperature decreases slightly during the coating process.

If epoxy powder (at 23° C.) is used it is typically sprayed on with epoxy guns, where the speed of the rotating pipe is about 9 m/min. The thickness of the epoxy and other coating materials are set in accordance with end use specified requirements. Normal thickness value for the epoxy layer, (on-shore installations) is from 70 to 200 μM, such as 135 μm.

Materials that may be used in the corrosion protection layer (C) are, for instance, epoxy resins and organosilicon compounds. Examples of suitable epoxy resins are phenol-based epoxies and amine-based epoxies. These kinds of epoxies are sold, among others, under trade names of AR8434 (of Teknos), Scotchkote 226N (of 3M) and PE50-7191 (of BASF). Suitable organosilicon compounds have been disclosed in EP-A-1859926.

The extrusion of the adhesive (D) and the coating (B) layer may be performed, for instance, with two single screw extruders. They may have a diameter of, for instance, from 30 to 100 mm, such as 60 mm, and a length of from 15 to 50 L/D, such as 30 L/D. The temperature is typically controlled in several zones and the temperature of the PE adhesive and coating layer after the die is from 190 to 300° C., such as 225 and 250° C., respectively. Die widths are from 50 to 300 mm, such as 110 mm and 240 mm for the adhesive layer (D) and coating layer (B), respectively. Both adhesive and the coating layer are usually rolled tightly onto the pipe with a silicone pressure roller. The thickness of the adhesive layer (D) is typically from 200 to 400 μm, such as 290 μm. The thickness of the coating layer (B) is typically from 1 to 5 mm, preferably from 2 to 4 mm, such as 3.2 mm.

Materials suitable to be used in the adhesion layer (D) are, for instance, acid or acid anhydride grafted olefin polymers, like polyethylene or polypropylene. Suitable polymers are, among others, fumaric acid modified polyethylene, fumaric acid anhydride modified polyethylene, maleic acid modified polyethylene, maleic acid anhydride modified polyethylene, fumaric acid modified polypropylene, fumaric acid anhydride modified polypropylene, maleic acid modified polypropylene and maleic acid anhydride modified polypropylene. Examples of especially suitable adhesion plastics are given in EP-A-1316598.

After the coating the coated pipe is cooled, for instance by providing water flow on the coated pipe surface.

The use of the coating composition (B-2) allows the coating process to be operated with a high throughput without operational problems, such as line breaks. Moreover, the problem of neck-in after the die is reduced with the present coating compositions compared with the prior art compositions. Further still, smooth coatings having good mechanical properties are obtained.

EXAMPLES

Methods

CTL

CTL is determined by using a method similar to ISO 6252: 1992 as follows.

The samples are prepared by pressing a plaque at 180° C. and 10 MPa pressure with a total length of 125 to 130 mm and a width at its ends of 21±0.5 mm. The plaque then is milled into the correct dimensions in a fixture on two of the sides with a centre distance of both holders of 90 mm and a hole diameter of 10 mm. The central part of the plaque has a parallel length of 30±0.5 mm, a width of 9±0.5 mm, and a thickness of 6±0.5 mm. A front notch of 2.5 mm depth is then cut into the sample with a razor blade fitted into a notching machine (PENT-NOTCHER, Norman Brown engineering), the notching speed is 0.2 mm/min. On the two remaining sides side grooves of 0.8 mm are cut which should be coplanar with the notch. After making the notches, the sample is conditioned in 23±1° C. and 50% relative humidity for at least 48 h. The samples are then mounted into a test chamber in which the active solution (10% solution of IGEPAL CO-730 in deionised water, chemical substance: 2-(4-nonyl-phenoxy) ethanol) is kept at 60° C. temperature. The samples are loaded with a dead weight corresponding to an initial stress of about 5 MPa and at the moment of breakage an automatic timer is shut off. The average of at least two measurements is reported.

The sample and the notch applied to the sample are shown in FIG. 1, in which:

A: total length of the specimen 125 to 130 mm
B: distance between the centre points of the holders 90 mm
C: width of the specimen at the end 21±0.5 mm
D: hole diameter 10 mm
E: side grooves 0.8 mm
F: thickness of plaque 6±0.2 mm
G: width of narrow parallel part 9±0.5 mm
H: main notch 2.5±0.02 mm The length of the narrow section of the specimen was 30±0.5 mm.

GPC

The weight average molecular weight Mw and the molecular weight distribution (MWD=Mw/Mn wherein Mn is the number average molecular weight and Mw is the weight average molecular weight) is measured by a method based on ISO 16014-4:2003 and ASTM D 6474-99. A Waters GPCV2000 instrument, equipped with refractive index detector and online viscosimeter was used with 2×GMHXL-HT and 1×G7000H columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with 15 narrow MWD polystyrene (PS) standards in the range of 1 kg/mol to 12 000 kg/mol. Mark Houwink constants were used for polystyrene and polyethylene (K: $19\times10^{-3}$ mL/g and a: 0.655 for PS, and K: $39\times10^{-3}$ mL/g and a: 0.725 for PE). All samples were prepared by dissolving 0.5-3.5 mg of polymer in 4 mL (at 140° C.) of stabilized TCB (same as mobile phase) and keeping for max. 3 hours at 160° C. with continuous shaking prior sampling in into the GPC instrument.

Melt Index, Melt Flow Rate, Flow Rate Ratio (MI, MFR, FRR):

Melt Index (MI) or Melt Flow Rate (MFR)

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Flow Rate Ratio (FRR)

The quantity FRR (flow rate ratio) is an indication of molecular weight distribution and denotes the ratio of flow rates at different loads. Thus, $FRR_{21/2}$ denotes the value of $MFR_{21}/MFR_2$.

Neck-in

Neck-in was given as a width of the film after the 110 mm die in mm. In this test series neck-in is registered at the maximum peripheral speed of pipe the molten film can manage without variations in width. The neck-in was measured at winding speeds of 15 and 20 RPM and screw speed of 25 RPM.

Peel Strength

Adhesion of polymer on steel was tested by Instron 1122 peel strength test equipment according to DIN 30670. A strip of 3 cm width is cut of the coating layer. The other end of the strip is fastened to pulling equipment and the pulling strength is measured during the peeling of the strip from the steel with a pulling speed of 10 mm/min. The results are expressed as N per cm. The peel strength was measured from the coatings produced at a screw speed of 50 RPM.

Pipe Coating

A steel pipe with a diameter of 114 mm was cleaned to remove the excess material from its surface. The pipe was then heated with induction heating to 190° C. Epoxy powder (Teknos AR8434) was then sprayed onto the pipe surface with the rotating speed of the line of 9 m/min so that the thickness of the epoxy layer was 135 μm. Then an adhesion plastic, a maleic acid anhydride grafted polyethylene adhesive, prepared according to composition 2 in EP 1 316 598 A1, was extruded onto the pipe by using a Barmag single screw extruder with an L/D ratio of 24 and a diameter of 45 mm and where the temperature of the melt after the die was 225° C. The die width was 110 mm. Simultaneously the composition of Example 1 was then extruded onto the adhesion layer by using a Krauss-Maffei extruder having a diameter of 45 mm and the L/D ratio of 30. The die width was 240 mm and the temperature of the melt after the die was 250° C. The coating was conducted at extruder screw speeds of 25, 50 and 100 RPM. At the screw speed of 25 RPM five different winding speeds were run, namely 9, 15, 20, 25 and 30 RPM. Maximum output was determined at 50 RPM screw speed.

Rheology

Rheological parameters such as Shear Thinning Index SHI and Viscosity were determined by using an Anton Paar Phisica MCR 300 Rheometer on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade were made.

The values of storage modulus (G'), loss modulus (G″) complex modulus (G*) and complex viscosity (η*) were obtained as a function of frequency (ω). $\eta_{100}$ is used as abbreviation for the complex viscosity at the frequency of 100 rad/s.

Shear thinning index (SHI), which correlates with MWD and is independent of Mw, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol, 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.).

SHI value is obtained by calculating the complex viscosities at given values of complex modulus and calculating the ratio of the two viscosities. For example, using the values of complex modulus of 1 kPa and 100 kPa, then η*(1 kPa) and η*(100 kPa) are obtained at a constant value of complex modulus of 1 kPa and 100 kPa, respectively. The shear thinning index $SHI_{1/100}$ is then defined as the ratio of the two viscosities η*(1 kPa) and η*(100 kPa), i.e. η(1)/η(100).

It is not always practical to measure the complex viscosity at a low value of the frequency directly. The value can be extrapolated by conducting the measurements down to the frequency of 0.126 rad/s, drawing the plot of complex viscosity vs. frequency in a logarithmic scale, drawing a best-fitting line through the five points corresponding to the lowest values of frequency and reading the viscosity value from this line.

Density:

Density of the polymer was measured according to ISO 1183-2/1872-2B.

Example 1

A loop reactor having a volume of 50 dm³ was operated continuously at a temperature of 60° C. and a pressure of 62 bar. Into the reactor were introduced 42 kg/h of propane diluent, 2 kg/h of ethylene and 35 g/h of hydrogen. In addition 6.3 g/h of a solid polymerisation catalyst component sold by BASF under a trade name of Lynx 200 was introduced into the reactor together with triethylaluminium cocatalyst so that the ratio of aluminium to titanium was 30 mol/mol. The rate of polymer production was about 1.8 kg/h.

The slurry from the 50 dm³ loop reactor was withdrawn and transferred continuously to another loop reactor having a volume of 500 dm³ and which was operated at a temperature of 95° C. and a pressure of 60 bar. Into the reactor were introduced additional propane diluent, ethylene and hydrogen. The ethylene concentration in the fluid mixture was 3.4 mol-%, based on the total number of moles in the fluid mixture, and the rate of polymer production was about 32 kg/h. The conditions and data can be seen in Table 1.

The slurry from the loop reactor was withdrawn by using settling legs into a flash vessel operated at a temperature of 50° C. and a pressure of 3 bar where the hydrogen and major part of the hydrocarbons was removed from the polymer. The ethylene homopolymer was directed into a fluidised bed gas phase reactor operated at 85° C. temperature and 20 bar pressure. Into the reactor were introduced additional ethylene, 1-hexene comonomer, hydrogen and nitrogen as inert gas. The ethylene concentration was 11 mol-%, based on the total number of moles in the gas mixture, and the other conditions and data are shown in Table 1.

The resulting polymer powder was dried from hydrocarbons and mixed with 3000 ppm of Irganox B225, 1000 ppm of calcium stearate and 2.4% of carbon black, based on the final composition. The mixture was then extruded into pellets by using a CIM90P twin screw extruder (manufactured by Japan Steel Works). The properties of the polymer and the composition are shown in Table 2.

The resulting composition was used in coating a steel pipe as described above in the description of the methods under the title "Pipe coating". Data is shown in Table 2.

Examples 2 to 5

The procedure of Example 1 was repeated except that the conditions were changed as indicated in Table 1. The polymer and composition data is shown in Table 2.

Comparative Example 6R

The multimodal ethylene polymer was similar to Polyethene #3 of Example 2 of EP 837915.

It can be seen from the data that in Examples 1 to 5, where the multimodal ethylene copolymer (B-1) according to the present invention was used, clearly had a higher output in the coating line, as well as a broader film after the die, than the Reference Example 6R.

The invention claimed is:

1. A polymer coated pipe comprising an inner surface, an outer surface layer (A) and a coating layer (B) covering said outer surface layer (A) wherein the coating layer (B) comprises a coating composition (B-2) comprising a multimodal ethylene copolymer (B-1), being a copolymer of ethylene and one or more alpha-olefin comonomers having from 4 to 10 carbon atoms, wherein the multimodal ethylene copolymer (B-1) has a weight average molecular weight of from 70000 g/mol to 250000 g/mol, the ratio of the weight average molecular weight to the number average molecular weight, Mw/Mn, of from 15 to 50, a melt index $MFR_2$, determined according to ISO 1133 at 190° C. under a load of 2.16 kg, of from 0.05 g/10 min to 5 g/10 min, a melt index $MFR_5$, determined according to ISO 1133 at 190° C. under a load of 5 kg, of from 1.0 to 10 g/10 min and a density of from 930 $kg/m^3$ to 955 $kg/m^3$.

TABLE 1

Polymerisation conditions

| | Example | | | | | |
|---|---|---|---|---|---|---|
| | 1 | 2 | 3 | 4 | 5 | 6R |
| $H_2/C_2$ in loop, mol/kmol | 722 | 752 | 745 | 745 | 757 | |
| $MFR_2$, loop, dg/min | 770 | 800 | 815 | 815 | 575 | 384 |
| Mw, loop, g/mol | 25000 | 24000 | | 22000 | 30000 | 21000 |
| $H_2/C_2$ in gpr, mol/kmol | 53 | 103 | 98 | 98 | 89 | |
| $C_6/C_2$ in gpr, mol/kmol | 133 | 71 | 70 | 70 | 78 | |
| Split, loop/gpr | 49/51 | 51/49 | 51/49 | 51/49 | 51/49 | 45/55 |
| $MFR_2$, g/10 min | 0.61 | 0.52 | 0.58 | 0.61 | 0.54 | |
| $MFR_5$, g/10 min | 2.7 | 2.3 | 2.5 | 2.6 | 2.4 | |
| Density, $kg/m^3$ | 941.1 | 949.7 | 950.0 | 949.9 | 948.4 | 941 |
| Extruder throughput, kg/h | 213 | 203 | 202 | 201 | 194 | |
| SEI, kWh/ton | 146 | 169 | 174 | 152 | 148 | |
| Melt temperature, ° C. | 217 | 226 | 226 | 222 | 223 | |

Notes:
[1] 1-butene as comonomer, $C_4/C_2$-ratio

TABLE 2

| | Example | | | | | |
|---|---|---|---|---|---|---|
| | 1 | 2 | 3 | 4 | 5 | 6R |
| $MFR_2$, g/10 min | 0.65 | 0.53 | 0.61 | 0.59 | 0.53 | 0.4 |
| $MFR_5$, g/10 min | 2.8 | 2.3 | 2.7 | 2.5 | 2.4 | 1.7 |
| $MFR_{21}$, g/10 min | | 57 | 71 | 68 | 68 | 34 |
| Density, $kg/m^3$ | 952.0 | 962.0 | 961.9 | 960.4 | 963.2 | |
| $\eta_{0.05}$, Pa·s | 22623 | 24412 | 22569 | 22721 | 25165 | 24267 |
| $\eta_{300}$, Pa·s | 495 | 543 | 524 | 519 | 525 | 682 |
| Tan($\delta_{0.05}$) | 2.64 | 2.69 | 2.64 | 2.70 | 2.56 | 3.84 |
| Tan($\delta_{300}$) | 0.59 | 0.60 | 0.61 | 0.60 | 0.60 | 0.59 |
| SHI(2.7/210) | 69 | 57 | 57 | 58 | 65 | 32 |
| CTL, h | 118 | 20 | 16 | 16 | 22 | 29 |
| Mw, g/mol | 127000 | 134000 | | 125000 | 140000 | 171000 |
| Mn, g/mol | 4280 | 4160 | | 3600 | 3990 | 24700 |
| Mw/Mn | 30 | 32 | | 35 | 35 | 7 |
| Peel strength at 23° C. | 385 | 279 | 322 | 411 | 393 | 585 |
| Peel strength at 80° C. | 208 | 193 | 161 | 185 | 168 | 191 |
| Neck-in at 20 rpm, mm | 84 | 80 | 83 | 83 | 85 | 76 |
| Neck-in at 15 rpm, mm | 98 | 93 | 98 | 96 | 94 | 90 |
| Output, kg/h, at 50 RPM | 40 | 41 | 43 | 42 | 41 | 37 |

2. The pipe according to claim 1 wherein the multimodal ethylene copolymer (B-1) has a ratio of weight average molecular weight to number average molecular weight, Mw/Mn, of from 20 to 50.

3. The pipe according to claim 1 wherein the coating composition (B-2) has a melt index $MFR_2$, determined according to ISO 1133 at 190° C. under a load of 2.16 kg, of 0.1 to 1.2 g/10 min and $MFR_5$, determined according to ISO 1133 at 190° C. under a load of 5 kg, of 1.0 to 5.0 g/10 min.

4. The pipe according to claim 1 wherein the coating composition (B-2) has an $SHI_{2.7/210}$ of from 30 to 100, where the $SHI_{2.7/210}$ is determined from oscillatory shear experiments within the linear viscosity range of strain at frequencies from 0.05 to 300 rad/s according to ISO 6721-1 as the ratio of the complex viscosities $\eta(2.7 \text{ kPa})/\eta(210 \text{ kPa})$.

5. The pipe according to claim 1 wherein the multimodal ethylene copolymer (B-1) comprises:
(B-1-1) from 40 to 60% based on the weight of the multimodal ethylene copolymer (B-1) a low molecular weight ethylene homopolymer component, said low molecular weight ethylene homopolymer component (B-1-1) having a weight average molecular weight of from 5000 g/mol to 35000 g/mol; and
(B-1-2) from 60 to 40% based on the weight of the multimodal ethylene copolymer (B-1) a high molecular weight ethylene copolymer component, said high molecular weight ethylene copolymer component (B-1-2) having a weight average molecular weight of from 100000 g/mol to 700000 g/mol.

6. The pipe according to claim 5 wherein the low molecular weight ethylene homopolymer component (B-1-1) has a melt index $MFR_2$, determined according to ISO 1133 at 190° C. under a load of 2.16 kg, of 500 g/10 min to 1500 g/10 min.

7. The pipe according to claim 5 wherein the multimodal ethylene copolymer (B-1) comprises from 49 to 59% by weight of the low molecular weight ethylene homopolymer component (B-1-1) and from 51 to 41% by weight of the high molecular weight ethylene copolymer component (B-1-2).

8. The pipe according to claim 5 wherein the high molecular weight ethylene copolymer component (B-1-2) is a copolymer of ethylene and one or more alpha-olefins having from 6 to 10 carbon atoms.

9. The pipe according to claim 1 wherein the pipe is a polymer coated metal pipe.

10. The pipe according to claim 1 wherein the outer surface layer (A) is covered by a corrosion preventing layer (C) which is further covered by the coating layer (B).

11. The pipe according to claim 10 wherein the corrosion preventing layer (C) is covered by an adhesive layer (D), which is further covered by the coating layer (B).

12. The pipe according to claim 1 wherein the outer surface layer (A) is covered by an adhesive layer (D), which is further covered by the coating layer (B).

13. The pipe according to claim 1 wherein the coating layer (B) comprises from 75 to 100% by weight, based on the total weight of the coating layer (B) of the coating composition (B-2) comprising the multimodal ethylene copolymer (B-1).

14. The pipe according to claim 1 wherein the coating composition (B-2) comprises from 80 to 100% by weight of the multimodal ethylene copolymer (B-1).

15. A process for producing a polymer coated pipe, comprising the steps of:
providing a pipe having an inner surface and an outer surface layer (A); and
applying a coating composition (B-2) onto the pipe outer surface layer (A) to form a coating layer (B), wherein the coating composition (B-2) comprises a multimodal ethylene copolymer (B-1), being a copolymer of ethylene and one or more alpha-olefin comonomers having from 4 to 10 carbon atoms, wherein the multimodal ethylene copolymer (B-1) has a weight average molecular weight of from 70000 g/mol to 250000 g/mol, the ratio of the weight average molecular weight to the number average molecular weight, Mw/Mn, of from 15 to 50, a melt index $MFR_2$, determined according to ISO 1133 at 190° C. under a load of 2.16 kg, of from 0.05 g/10 min to 5 g/10 min, a melt index $MFR_5$, determined according to ISO 1133 at 190° C. under a load of 5 kg, of from 1.0 to 10 g/10 min and a density of from 930 kg/m³ to 955 kg/m³.

16. A process according to claim 15 comprising the steps of:
(i) polymerising, in a first polymerisation stage, a low molecular weight ethylene homopolymer component (B-1-1) in the presence of a polymerisation catalyst, hydrogen, ethylene and optionally an inert diluent to produce an ethylene homopolymer having a weight average molecular weight of from 5000 g/mol to 35000 g/mol and which constitutes from 40 to 60% by weight of the multimodal ethylene copolymer (B-1); and
(ii) polymerising, in a second polymerisation stage, a high molecular weight ethylene copolymer component (B-1-2), being a copolymer of ethylene and one or more alpha-olefin comonomers having from 4 to 10 carbon atoms in the presence of a polymerisation catalyst, ethylene, at least one alpha-olefin comonomer having from 4 to 10 carbon atoms, and optionally hydrogen and/or an inert diluent to produce a copolymer of ethylene and one or more alpha-olefin comonomers having from 4 to 10 carbon atoms having a weight average molecular weight of from 200000 g/mol to 700000 g/mol, which high molecular weight ethylene component (B-1-2) constitutes from 40 to 60% by weight of the multimodal ethylene copolymer (B-1); and wherein said first and said second polymerisation step are performed as successive polymerisation steps with the polymer product produced in any previous step being present in the subsequent step(s) and wherein said first step and said second step can be performed in any order;
(iii) recovering said multimodal ethylene copolymer (B-1);
(iv) obtaining the coating composition (B-2) comprising 80 to 100% by weight of the multimodal ethylene copolymer (B-1), optional additives and optional other polymers;
(iv) applying said coating composition (B-2) onto the pipe outer surface layer (A) to form the coating layer (B).

17. The process according to claim 16 wherein the polymerisation step (i) is performed in a polymerisation stage preceding the polymerisation step (ii).

18. The process according to claim 16 wherein the polymerisation step (ii) is performed in a polymerisation stage preceding the polymerisation step (i).

19. The process according to claim 16 wherein the polymerisation is conducted in the presence of a polymerisation catalyst comprising a solid component comprising titanium, halogen and magnesium, optionally supported on a particulate support, together with an aluminium alkyl cocatalyst.

20. The process according to claim 19 wherein the catalyst comprises a titanium compound and a magnesium dihalide without an inert inorganic oxide support.

21. The process according to claim 19 wherein the solid catalyst component is introduced into the first polymerisation step and is therefrom transferred into the subsequent step(s)

and where no additional solid catalyst component is introduced into said subsequent step(s).

22. The process according to claim 15 wherein a corrosion preventing layer (C) is applied onto the pipe outer surface layer (A) before coating it with the coating layer (B).

23. The process according to claim 22 wherein an adhesive layer (D) is applied onto the corrosion preventing layer (C) before coating it with the coating layer (B).

24. The process according to claim 16, wherein an adhesive layer (D) is applied onto the pipe before coating it with the coating layer (B).

25. The process according to claim 15, wherein the multimodal ethylene copolymer (B-1) has a ratio of weight average molecular weight to number average molecular weight, Mw/Mn, of from 20 to 50.

26. The process according to claim 16 wherein the low molecular weight ethylene homopolymer component (B-1-1) has a melt index $MFR_2$, determined according to ISO 1133 at 190° C. under a load of 2.16 kg, of 500 to 1500 g/10 min.

27. The process according to claim 16 wherein the multimodal ethylene copolymer (B-1) comprises from 49 to 59% by weight of the low molecular weight ethylene homopolymer component (B-1-1) and from 51 to 41% by weight of the high molecular weight ethylene copolymer component (B-1-2).

28. The pipe according to claim 3 wherein the coating composition (B-2) has a melt index $MFR_2$, determined according to ISO 1133 at 190° C. under a load of 2.16 kg, from 0.2 to 1.0 g/10 min.

29. The pipe according to claim 4 wherein the coating composition (B-2) has an $SHI_{2.7/210}$ of from 35 to 100 where the $SHI_{2.71/210}$ is determined from oscillatory shear experiments within the linear viscosity range of strain at frequencies from 0.05 to 300 rad/s according to ISO 6721-1 as the ratio of the complex viscosities $\eta(2.7\ kPa)/\eta(210\ kPa)$.

30. The pipe according to claim 29 wherein the coating composition (B-2) has an $SHI_{2.7/210}$ of from 50 to 90 where the $SHI_{2.7/210}$ is determined from oscillatory shear experiments within the linear viscosity range of strain at frequencies from 0.05 to 300 rad/s according to ISO 6721-1 as the ratio of the complex viscosities $\eta(2.7\ kPa)/\eta(210\ kPa)$.

* * * * *

UNITED STATES PATENT AND TRADEMARK OFFICE
CERTIFICATE OF CORRECTION

PATENT NO. : 8,361,578 B2  Page 1 of 1
APPLICATION NO. : 12/745804
DATED : January 29, 2013
INVENTOR(S) : Backman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 141 days.

Signed and Sealed this

First Day of September, 2015

Michelle K. Lee
*Director of the United States Patent and Trademark Office*